United States Patent [19]

Kang et al.

[11] Patent Number: 5,657,624
[45] Date of Patent: Aug. 19, 1997

[54] INTEGRATED PRODUCTION OF OXYGEN AND ELECTRIC POWER

[75] Inventors: Doohee Kang, Macungie, Pa.; Robert Michael Thorogood, Cary, N.C.; Rodney John Allam, Guildford; Anthony Knut James Topham, Walton on Thames, both of England

[73] Assignee: Air Products and Chemicals, Inc., Allentown, Pa.

[21] Appl. No.: 427,779

[22] Filed: Apr. 25, 1995

Related U.S. Application Data

[63] Continuation-in-part of Ser. No. 170,080, Dec. 17, 1993, abandoned.

[51] Int. Cl.$^6$ .................................................. F02G 3/00
[52] U.S. Cl. .................. 60/39.02; 60/39.12; 60/39.461; 60/39.52
[58] Field of Search ............................ 60/39.02, 39.12, 60/39.461, 39.52, 39.55, 720

[56] References Cited

U.S. PATENT DOCUMENTS

| | | | |
|---|---|---|---|
| 4,019,314 | 4/1977 | Springmann | 60/39.02 |
| 4,545,787 | 10/1985 | Hegarty | 55/16 |
| 5,035,727 | 7/1991 | Chen | 55/16 |
| 5,118,395 | 6/1992 | Chen et al. | 204/59 |
| 5,172,544 | 12/1992 | Funayama et al. | 60/39.02 |
| 5,245,110 | 9/1993 | Van Dijk et al. | 585/946 |

OTHER PUBLICATIONS

Wright, J. D., Copeland, R. J., "Advanced Oxygen Separation Membranes", Report No. TDA–GRI–90/0303, prepared for the Gas Research Institute, Sep. 1990.

Clark, D. J. et al, "Separation of Oxygen by Using Zirconia Solid Electrolyte Membranes" in *Gas Separation and Purification* 1992, vol. 6, No. 4, pp. 201–205.

Dharmadhikari, S., "Understanding Gas Turbine Cycles" in *The Chemical Engineer*, 28 Jan. 1993, pp. 17–20.

*Primary Examiner*—Charles G. Freay
*Attorney, Agent, or Firm*—John M. Fernbacher

[57] ABSTRACT

A method for the recovery of oxygen from air in which a high-temperature ion transport membrane system is integrated with combustion turbine system. Coproduction of oxygen and electric power is achieved in an alternative embodiment by integrating a combined cycle power generation system with an ion transport membrane system. The design performance of the gas turbine in the combined cycle system is maintained by controlled water injection into the membrane non-permeate stream, all or a portion of which optionally is introduced into the gas turbine combustor. Water can be introduced directly into the combustor air inlet. Alternatively, makeup air is added to the membrane feed to maintain the performance of the gas turbine. NOx formation is reduced by introducing the oxygen-depleted non-permeate from the membrane system to the gas turbine combustor.

20 Claims, 3 Drawing Sheets

INTEGRATED PRODUCTION OF OXYGEN AND ELECTRIC POWER

This application is a continuation-in-part of U.S. Ser. No. 08/170,080 filed Dec. 17, 1993, now abandonned.

FIELD OF THE INVENTION

The invention pertains to the recovery of oxygen by a high temperature ion transport membrane system, and in particular to the integration of a mixed conductor membrane system with a gas turbine power generation system.

BACKGROUND OF THE INVENTION

Oxygen is an economically important gas which is widely used in large-scale industrial applications. New uses for oxygen are emerging in advanced high-temperature processes for iron and steel manufacture, coal gasification, oxygen-enriched combustion, and in particular integrated gasification combined cycle power generation. In these large-scale applications, the cost of oxygen produced by conventional cryogenic or noncryogenic technology is a major portion of the overall operating cost, and lower oxygen cost will encourage the commercialization of these emerging technologies. New oxygen separation processes which can be thermally integrated with these advanced high-temperature processes will reduce the energy consumed in oxygen production, which in turn will promote the technical and commercial development of such integrated systems.

Oxygen can be recovered from air at high temperatures by inorganic oxide ceramic materials utilized in the form of selectively permeable non-porous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane ions to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of such membranes is given in report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. The effective use of this energy in the overall operation of a mixed conductor membrane system is necessary if the system is to be competitive with conventional cryogenic technology for large scale oxygen production. Energy recovery and effective utilization thereof is possible by the integration of compressors, combustors, hot gas turbines, steam turbines, and heat exchangers with the mixed conductor membrane module. U.S. Pat. No. 4,545,787 discloses the production of oxygen and net power in the integrated operation of a mixed conductor ceramic membrane. Air is compressed, heated, and passed through a membrane separator to produce an oxygen permeate and an oxygen-containing non-permeate stream. The non-permeate stream is combusted with a fuel and the hot combustion gases are expanded in a hot gas turbine. The turbine provides shaft power for the compressor and drives a generator for export of electricity, and turbine exhaust is optionally used to cogenerate steam or to preheat the compressed air membrane feed. Alternately, the membrane is placed downstream of the combustion step.

U.S. Pat. No. 5,035,727 describes the recovery of oxygen by a solid electrolyte membrane in conjunction with an externally-fired gas turbine in which compressed air is heated indirectly and passed through the membrane module. Non-permeate gas is expanded through a hot gas turbine, the turbine exhaust is heated by direct combustion, and the combustion products provide heat indirectly to the membrane feed. Steam is recovered from the waste heat after heat exchange with the membrane feed.

U.S. Pat. No. 5,118,395 describes the recovery of oxygen from gas turbine exhaust utilizing a solid electrolyte membrane with the coproduction of electric power and steam. A supplemental burner heats the turbine exhaust prior to the membrane, and steam is generated by the membrane non-permeate stream. Related U.S. Pat. No. 5,174,886 discloses a similar system in which intermediate turbine exhaust is passed through the membrane and the membrane non-permeate stream is further expanded through another turbine stage. In both patents, turbine shaft power is used to drive the air compressor and an electric generator.

The report by J. D. Wright and R. J. Copeland identified above discloses at p. 55 a gas turbine-driven ceramic membrane system in which air is compressed, heated indirectly in a fired heater, and passed through the membrane to yield oxygen and non-permeate gas. The non-permeate gas is combusted with natural gas in the fired heater and the combustion products are expanded through a hot gas turbine to drive the compressor and generate electric power. Heating of the air feed to the membrane and the combustion of fuel and non-permeate gas prior to the turbine thus are accomplished in a single integrated combustion chamber.

U.S. Pat. No. 5,245,110 (equivalent to PCT International Publication No. WO 93/06041) discloses the integration of a gas turbine with an oxygen-selective membrane system. The permeate side of the membrane is swept with air to yield an enriched air product containing about 35 vol % oxygen. The enriched air product is used in a hydrocarbon reformer or gasifier process, and tail gas from the reformer or gasifier is introduced into the gas turbine combustor to balance the flow of hot gas to the turbine. The nitrogen from the permeate and membrane sweep air replaces the mass lost when oxygen is consumed in the reformer or gasifier process, which maintains the turbine in a desired mass and thermal balance.

An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

A combined cycle power generation system is a highly efficient system which utilizes a gas turbine to drive an electric generator, wherein heat is recovered from the turbine exhaust as steam which drives an additional electric generator. A description of typical combined cycle power generation systems is given in *The Chemical Engineer*, 28 Jan. 1993, pp. 17–20. The compressor, combustor, and expansion turbine are carefully designed and integrated to maximize the efficiency of each component and thus the efficiency of the integrated system. Preferably these systems are operated at steady-state design conditions, since significant deviations from these conditions will adversely affect system efficiency.

The successful development and commercialization of oxygen production by ion transport membranes will require flexible systems which maximize energy utilization and allow operation of system components at optimum conditions. In addition, the integration of such systems with an available heat source and heat sink, such as a combined cycle power generation system, is highly desirable. The invention disclosed below and described in the following claims advances the art and provides improved methods for the production of oxygen by means of an integrated ion transport membrane/combined cycle gas turbine system.

SUMMARY OF THE INVENTION

The invention is a method for the recovery of oxygen from air which comprises compressing an air feed stream and dividing the stream into a first and a second compressed air stream. The first compressed air stream is combusted with a first fuel in a first combustor to produce a hot pressurized combustion product and the second compressed air stream is heated to yield a hot oxygen-containing feed gas. This feed gas flows into a membrane separation zone comprising one or more oxygen-selective ion transport membranes from which are withdrawn a hot oxygen-enriched permeate stream and a hot oxygen-depleted non-permeate stream. The hot oxygen-depleted non-permeate stream and the hot pressurized combustion product are combined and passed through an expansion turbine to generate shaft power and hot exhaust gas, and the shaft power is used in part to compress the first air stream. Additional shaft power optionally is used to operate a first electric generator. The hot exhaust gas optionally is cooled by indirect heat exchange with water to generate steam which is expanded through a steam turbine to operate a second electric generator. The ion transport membrane preferably is a mixed conductor membrane.

The mass flow of gas removed from the compressed air feed by the ion transport membrane can be replaced by introducing a selected stream of makeup air to the membrane feed and firing the first combustor such that the temperature, pressure, and mass flow rate of the hot gas to the expansion turbine remains constant. Optionally at least a portion of the non-permeate stream can be introduced into the first combustor. Alternatively, water can be introduced into the hot oxygen-depleted non-permeate stream prior to the expansion turbine. Optionally at least a portion of the cooled water-containing nonpermeate stream can be introduced into the first combustor. The water injection rate and firing rate to the first combustor are controlled to maintain the temperature, pressure, and mass flow rate of the hot gas to the expansion turbine.

In a combined cycle electric power generation system, feed air is compressed to yield a pressurized combustor feed which is heated in a gas turbine combustor fired by a turbine fuel, wherein the hot combustion product is expanded through an expansion turbine to generate shaft power which is used in part to compress the feed air and in part to drive an electric generator. Hot exhaust gas from the expansion turbine is utilized to generate high pressure steam which is expanded through a steam turbine to drive another electric generator. The present invention also is a method to produce oxygen in combination with such a combined cycle power generation system wherein optionally the oxygen production and combined cycle systems are integrated such that the combined cycle system performance is unaffected by the operation of the oxygen production system. The invention comprises withdrawing a portion of the pressurized combustor feed and combusting the portion with fuel gas in a direct-fired combustor to produce a hot oxygen-containing combustion product. This hot oxygen-containing combustion product is passed into a membrane separation zone comprising one or more oxygen-selective ion transport membranes, and a hot high-purity oxygen permeate stream and a hot oxygen-depleted non-permeate stream are withdrawn therefrom. Water is injected into the hot oxygen-depleted non-permeate stream, thereby cooling the stream, and optionally at least a portion of the resulting cooled stream is injected into the gas turbine combustor. The temperature, pressure, and mass flow rate of the hot combustion product passing to the expansion turbine are maintained at fixed values by controlling the flow rate of water injected and the firing rate of the gas turbine combustor. In an alternate mode of operation, makeup air to the membrane feed is utilized to maintain the gas turbine inlet conditions. In this mode the temperature, pressure, and mass flow rate of the hot combustion product passing to said expansion turbine are maintained at fixed values by controlling the flow rate of makeup air and the firing rate of the gas turbine combustor.

The present invention includes a method for the coproduction of oxygen and electric power which comprises compressing an oxygen-containing gas and dividing the compressed gas into a first and a second compressed feed stream, combusting the first compressed feed stream with a first fuel in a first combustor to produce a hot pressurized combustion product, and heating the second compressed feed stream to yield a hot oxygen-containing feed gas. The hot oxygen-containing feed gas is passed into a membrane separation zone comprising one or more oxygen-selective mixed conductor membranes, and a hot high-purity oxygen permeate stream and a hot oxygen-depleted non-permeate stream are withdrawn therefrom. The hot oxygen-depleted non-permeate stream and the hot pressurized combustion product are combined and passed through an expansion turbine to generate shaft power and hot exhaust gas, wherein the shaft power is used in part to compress the first air stream and in part to operate a first electric generator. Optionally, the hot exhaust gas is cooled by indirect heat exchange with water to generate steam and the steam is expanded through a steam turbine to operate a second electric generator.

DETAILED DESCRIPTION OF THE INVENTION

The present invention utilizes a solid ceramic ion transport membrane integrated with a high-temperature process in which heat is utilized effectively for the operation of both the membrane and the high-temperature process. The membrane and the high-temperature process are operated at different temperatures to maximize the performance of each. The membrane operates by a mechanism in which an oxygen partial pressure differential or a voltage differential across the membrane causes oxygen ions to migrate through the membrane from the feed side to the permeate side where the oxygen ions recombine to form oxygen gas and free electrons. An ion transport membrane of the pressure-driven type is defined herein as a mixed conductor membrane, in which the electrons simultaneously migrate through the membrane to preserve internal electrical neutrality. The term pressure-driven means that oxygen ions move through the membrane in the direction of decreasing oxygen partial pressure. An ion transport membrane of the electrically-driven type is defined herein as a solid electrolyte membrane, in which the electrons flow from the permeate side to the feed side of the membrane in an external circuit driven by a voltage differential. A mechanically perfect membrane of either type operating without gas leakage is infinitely selective for oxygen; in practical applications an oxygen product purity of at least 98 vol % is achievable.

Figure 1:
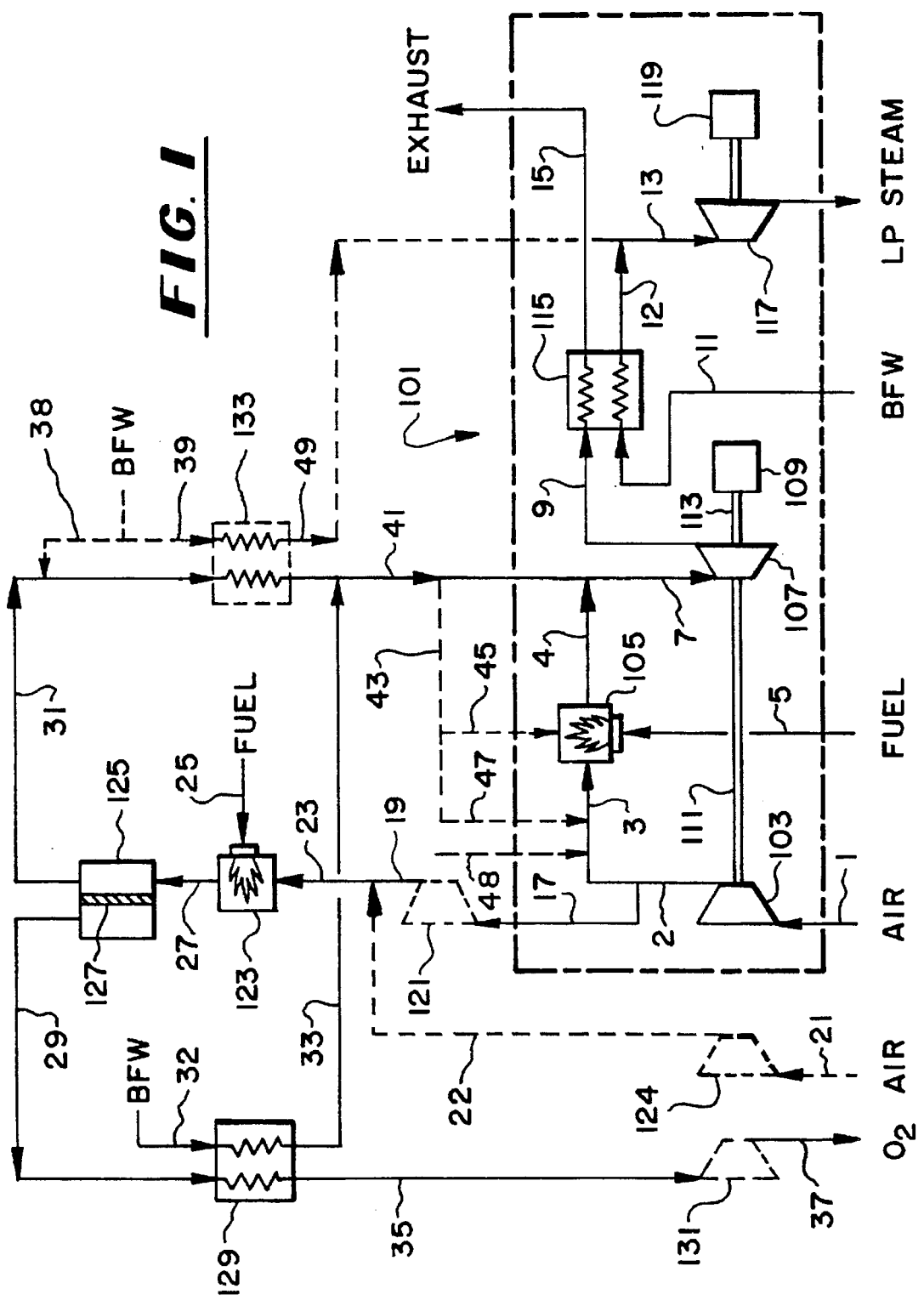
FIG. 1 is a schematic flowsheet of an integrated combined cycle power generation/oxygen production system of the present invention.

An ion transport membrane, preferably a mixed conductor membrane, is integrated with combined cycle power generation system 101 illustrated in the flowsheet of FIG. 1. An oxygen-containing gas, preferably air 1, is compressed to 50–500 psia in compressor 103 and the compressed air stream 3 is combusted with fuel 5 in burner 105 to generate hot combustion product 4 at 40–450 psia and 750°–3500° F., which is expanded as stream 7 through expansion turbine 107 to generate shaft power. This power is transmitted to compressor 103 and electric generator 109 via shafts 111 and 113 respectively. Burner 105 is a combustor of the type known and used in the gas turbine art, is preferably gas-fired, and utilizes fuel 5 which is natural gas, synthesis gas comprising hydrogen and carbon monoxide, refinery fuel gas containing mixed hydrocarbons, or other combustible gas mixture. Fuel 5 alternately can be an acceptable liquid fuel usable in a direct-fired gas turbine. Optionally, turbine exhaust 9 is cooled against boiler feedwater 11 in heat exchange zone 115 to generate high pressure steam 12 and exhaust 15, and steam 13 is expanded through steam turbine system 117 which drives electric generator 119.

The present invention includes the integration of the high temperature ion transport membrane with a combined cycle power generation system 101 in several embodiments as described herein. In all embodiments, a portion 17 of compressed air 2 from compressor 103 is withdrawn or "borrowed", thereby reducing the flow of compressed air to combustor 105. If necessary the pressure of borrowed air 17 is increased in blower 121 to yield compressed air 19 which compensates for pressure drop through the oxygen recovery circuit. Optionally, a supplemental stream of oxygen-containing gas, preferably air 21, is compressed in compressor 124 and is combined with air 19 to yield compressed air stream 23, which is combusted with fuel gas 25 in direct-fired combustor 123 to yield hot oxygen-containing gas 27. This combustor, for example of the type known and used in the gas turbine art, is preferably gas-fired, and utilizes fuel gas 25 which is natural gas, synthesis gas comprising hydrogen and carbon monoxide, refinery fuel gas containing mixed hydrocarbons, or other combustible gas mixture. Combustor 123 is operated with sufficient excess air such that hot combustion stream 27 contains about 10–20 vol % oxygen at a temperature of 800° to 2,000° F., preferably 1,000° to 1,600° F. Combustor 123 is fired to control the temperature of stream 27 at a desired value which is independent of the operation of combustor 105 and the temperature of hot combustion product 4. Alternatively, combustor 123 can be a catalytic combustor.

Hot gas 27 passes through the feed side of membrane separation zone 125 comprising mixed conductor membrane 127 which is of the mixed conductor type, wherein oxygen diffuses through the membrane driven by an oxygen partial pressure differential in the range of 2 to 100 psi, and high purity oxygen stream 29 containing at least 98 vol % oxygen is withdrawn therefrom at 2 to 30 psia. Hot non-permeate stream 31 is withdrawn at near feed pressure and contains 6 to 18 vol % oxygen. Membrane 127 operates in the temperature range of 800° to 2,000° F., preferably 1,000° to 1,600° F. Membrane separation zone 125 typically is sized and operated such that up to about 80 of the oxygen in membrane feed 27 is recovered as product 29.

Alternatively, ion transport membrane 127 can be of the solid electrolyte type as described earlier which is driven by a voltage differential across the membrane in which electrons are conducted through an external circuit with porous electrodes attached to the surfaces of the membrane. In this mode of operation the oxygen permeate product is recovered at or above the feed pressure.

Ion transport membrane 127 is typically a solid ceramic assembly in the form of tubes, sheets, or a monolithic honeycomb. The membrane divides membrane separation zone 125 into a feed side having a higher oxygen partial pressure and a permeate side having a lower oxygen partial pressure. Typical compositions of the active membrane material are given in representative articles by Y. Teraoka et al in *Chemistry Letters*, 1985, pp.1743–1746 and by H. Iwahara et al in *Advances in Ceramics*, Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Preferred membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.8}Fe_{0.2}O_{3-x}$ where x is between 0 and 1.

Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen,and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

Referring again to FIG. 1, high purity oxygen stream 29 is cooled against boiler feedwater 32 in heat exchange zone 129 to yield steam 33 and cooled oxygen product 35. Optionally, oxygen product 35 can be withdrawn through vacuum blower 131 to increase the oxygen partial pressure driving force across mixed conductor membrane 127. Alternatively, vacuum blower 131 can be replaced by an oxygen compressor to provide oxygen product 37 at an elevated pressure. Steam 33 may be combined (not shown) with steam 12 from the combined cycle power generation system with the combined steam 13 flowing to steam turbine 117. Hot non-permeate stream 31 is combined with turbine combustor outlet gas 4 to yield hot combustion product 7 which drives expansion turbine 107.

In the mode of operation described above, combustor 105 will operate at a reduced firing rate compared to the normal operation of combined cycle system 101 because the withdrawal of compressed air stream 17 reduces the flow of compressed air 3 to combustor 105. When such operation of combustor 105 may become undesirable, an alternative mode of operation is possible in which hot non-permeate stream 31 is cooled against boiler feedwater 39 in heat exchange zone 133 to yield cooled non-permeate 41; at least a portion 43 of non-permeate 41 is introduced directly into combustor 105 as stream 45 or upstream of the combustor as stream 47. Combustor 105 thus can be operated at near-normal design conditions even though the oxygen content of oxidant stream 3 is less than that of air. Steam 49 generated in heat exchange zone 133 then flows to steam turbine 117 which drives generator 119.

An important feature of the invention as described above is that the respective temperatures of the inlet streams to membrane zone 125 and expansion turbine 107 can be controlled independently to maximize the performance of both the membrane and the turbine. Thus the membrane and the turbine are thermally delinked and the overall efficiencies of oxygen generation and electric power generation can be maximized.

The operation of the oxygen recovery system described above with combined cycle power generation system 101 may be controlled if desired such that the operation of expansion turbine 107 is unchanged over the initial combined cycle design conditions. Therefore it is necessary to maintain expansion turbine inlet stream 7 at constant design conditions of temperature, pressure, and mass flow rate. This is accomplished by controlling the flow rate of supplemental compressed air 22 and the firing rate of combustor 105 while maintaining other operating parameters constant. The amount of hot gas lost from turbine inlet stream 7 due to withdrawal of oxygen product 37 is compensated for by supplemental air 22 and the combustion products from the combustion of fuel 25 in combustor 123. This ability to extract an oxygen product without changing the operation of the combined cycle gas turbine system is an important feature of the present invention.

The relative amount of air withdrawn or "borrowed" as stream 17 for the recovery of oxygen therefrom will set the required amount of supplemental air 22 and the firing rate of combustor 123 (which in turn is fixed by the desired temperature of membrane separation zone 125). As more air 17 is withdrawn, the amount of oxygen recovered will increase, while the total amount of power generated by electric generators 109 and 119 will remain constant. As more air 17 is borrowed, the firing rate of combustor 123 will increase while the firing rate of combustor 105 will decrease. Typically up to 20% of compressed air 2 can be withdrawn as air 17.

The oxygen content of the air passing through combustor 123 and membrane separation zone 125 is reduced, so that non-permeate stream 41 is oxygen-lean or nitrogen-enriched relative to air. Because of this reduction in oxygen, a benefit is realized when at least a portion of stream 41 is introduced into the oxidant gas to combustor 105. Since the overall oxygen content of stream 41 is less than that of air, the generation of nitrogen oxides (described herein as NOx) in combustor 105 and emission thereof in exhaust 15 will be reduced as illustrated in the Examples which follow. In addition, the residual oxygen concentration in hot gas 7 to expansion turbine 107 will be reduced, which may allow the use of less expensive materials and reduce maintenance requirements for the turbine.

Heat exchange zones 115, 129, and 133 shown schematically in FIG. 1 are essentially steam boilers which recover heat from hot gases as is known in the art. No high temperature gas-gas heat exchangers are required in this embodiment of the invention.

The system of FIG. 1 can be operated in an alternative mode wherein hot oxygen-containing non-permeate 31 is cooled in a different manner before passing to combustor 105 as stream 45 or 47. Instead of cooling stream 31 in exchanger 133 as described above, boiler feedwater 32 is preheated against hot oxygen permeate 29 in exchanger 129 to yield water stream 33, in the liquid, liquid/vapor, or vapor state, which is combined directly with stream 31 prior to expansion turbine 107 to yield cooled stream 41. Optionally, all or a portion of cooled stream 41 passes to combustor 105 as stream 45 or 47, in which case blower 121 is required. The addition of water stream 33 in this manner increases the mass flow to combustor 105 and combustion turbine 107, and by properly selecting the flow rate of water stream 33 the need for makeup air 22 and compressor 124 can be eliminated. If cooling of hot oxygen permeate 29 by exchanger 129 is not required, boiler feedwater 38 can be injected directly into hot nonpermeate stream 31 both to cool the stream and to increase the mass flow of gas to combustor 105 and combustion turbine 107. Alternatively, water 48 can be introduced into compressed air 3 prior to combustor 105. Water 48 can be supplied as all or a portion of heated water 33 (not shown). The use of water addition as one or more of streams 33, 38, and 48 is generally the preferred method for cooling and increasing the mass flow of gas to combustor 105 and combustion turbine 107. Water can be introduced in the liquid, liquid/vapor, or vapor state.

Figure 2:
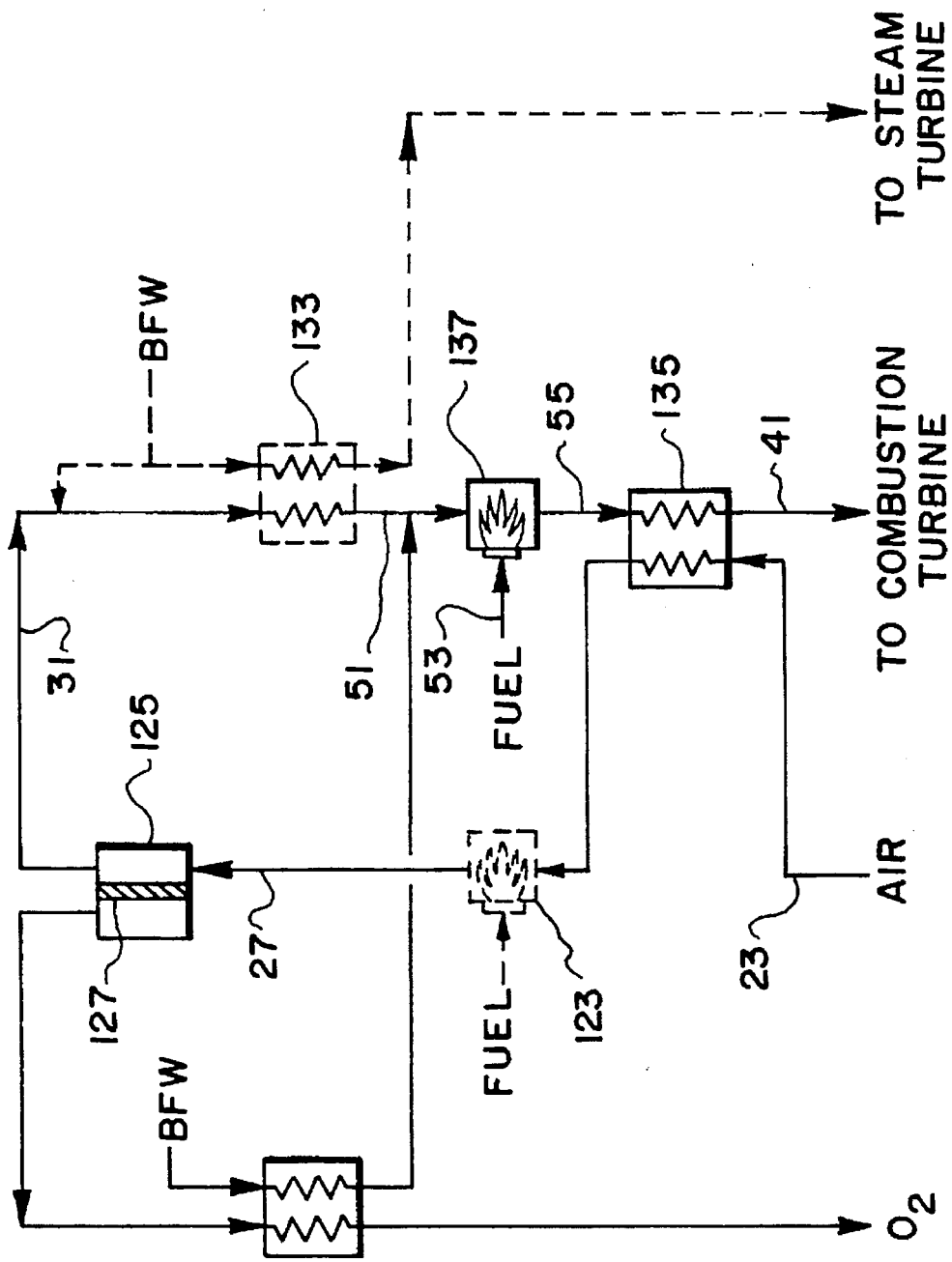
FIG. 2 is an alternative method for heating the compressed air feed to the membrane separation zone of the present invention.

An alternative method for heating pressurized air feed 27 to mixed conductor membrane separation zone 125 for permeation through mixed conductor membrane 127 is illustrated in FIG. 2. Pressurized air 23 (identical to stream 23 in FIG. 1) is heated in heat exchange zone 135 by indirect heat exchange with hot combustion product 55 to yield pressurized air feed 27. Heat exchange zone 135 can utilize any type of heat exchanger appropriate for this service. Such heat exchangers are manufactured for example by Hague International and Heatric, Ltd. Hot non-permeate stream 31 is optionally cooled against boiler feedwater in heat exchange zone 133; stream 31 or optionally stream 51 is combusted with fuel 53 in direct-fired combustor 137 to yield hot combustion product 55. Combustor 137 may be of the type known and used in the gas turbine art, is preferably gas-fired, and utilizes fuel gas 53 which is natural gas, synthesis gas comprising hydrogen and carbon monoxide, refinery fuel gas containing mixed hydrocarbons, or other combustible gas mixtures. Combustor 137 is fired to control the temperature of stream 27 at a desired value which is independent of the temperature of hot combustion product 4. Alternatively, combustor 137 can be a catalytic combustor.

This alternative method for heating pressurized air feed 27 has an advantage over direct heating by combustor 123 of FIG. 1 in that membrane feed 27 is clean, i.e. contains no combustion products, and contains 20.9 vol % oxygen, which gives a larger driving force for permeation and thus requires less membrane area. The method of FIG. 2 has disadvantages, however, since it requires gas-gas heat exchange zone 135, which in turn requires that inlet stream 55 be heated to a higher temperature than membrane zone feed 27. The choice of a method for heating membrane feed 27 will depend on specific operating requirements of membrane 127 as well as the capital cost and technical requirements of gas-gas heat exchange zone 135.

In an alternative mode of operation, hot oxygen-containing non-permeate gas 31 is cooled in exchanger 135 by indirect heat exchange to preheat stream 23 which is further heated in combustor 123 as shown in FIG. 2. In this mode, exchanger 133 and combustor 137 are not utilized. This preheating of stream 23 reduces the firing rate of combustor 123 compared with the mode described in FIG. 1.

The process as described above preferably utilizes air as feed streams 1 and 21, but can be operated on any oxygen-containing gas which contains sufficient oxygen to support combustion in combustors 105 and 123. The practical lower concentration of oxygen in streams 1 and 21 is about 5 vol %.

The present invention is not limited to the use of a mixed conductor membrane with an existing gas turbine system in a retrofit mode as described above, but also may be incorporated into a new combined cycle gas turbine system. The design of a new integrated oxygen and power generation system based on the process of FIG. 1 would not require makeup air 21 and therefore compressor 124 would be unnecessary, since compressor 103 would be sized to supply the air required for oxygen recovery and for combustor 105. In addition, the integrated design of combined cycle power generation system 101 would be optimized for the generation of both oxygen and electric power or alternatively for the generation of both oxygen and steam.

EXAMPLE 1

The process of FIG. 1 was simulated by carrying out a heat and material balance for a unit oxygen production of 1.0 ton/day by borrowing air 17 from compressed air 2 of combined cycle power generation system 101 and adding makeup air 21 to aid in maintaining the flow of hot gas 7 to expansion turbine 107. Steam 49 is raised by cooling non-permeate 31 in exchanger 133, and all of cooled non-permeate 41 is combined as stream 47 with the remaining compressed air from main compressor 103 as oxidant gas 3 into combustor 105. The oxygen concentration of oxidant gas 3 will be reduced relative to that of air; the degree of reduction will depend upon the flow rate of borrowed air 17. As more air is borrowed, the oxygen concentration of oxidant gas 3 will decrease.

The calculated heat and material balance was carried out for membrane zone 125 operating at 850° C. and recovering 79% of the maximum recoverable oxygen in feed air 27. Natural gas is fired to combustors 123 and 133. Compressors and blowers operate at 78% isentropic efficiency, and pressure drops are 15 psi across the feed side of membrane zone 125 and 100 torr (1.93 psi) in the permeate product circuit through oxygen product 35. Main air compressor 103 and makeup compressor 124 operate at 220 and 235 psig respectively.

An overall material balance based upon a unit oxygen production of 1.0 ton/day is summarized in Table 1.

TABLE 1

| Stream (FIG. 1) | Gas Flow, lb/lb of Oxygen Product |
|---|---|
| Borrowed air (17) | 9.6 |
| Net Combustion products (Combustor 123) | 0.1 |
| Makeup air (21) | 0.9 |
| Oxygen product (37) | 1.0 |
| Hot Non-permeate (41) | 9.6 |

The amount of combustion products from combustor 123 will depend upon the amount of heat required to operate membrane zone 125 at the design temperature of 850° C. The amount of makeup air 21 is selected so that the amount of gas removed as product oxygen is balanced by combustion products plus makeup air. The unit mass flow of hot non-permeate gas 41 is thus equal to that of borrowed air 17, and inlet gas 7 to hot gas turbine 107 remains constant in temperature, pressure, and mass flow rate. This allows the production of oxygen without changing the performance of combined cycle power generation system 101, which is an important feature of the present invention.

Mechanical energy requirements were calculated for the unit production of oxygen and are summarized in Table 2.

TABLE 2

| Prime Mover (FIG. 1) | Mechanical Energy Required, kWH per Ton Oxygen Product |
|---|---|
| Booster Blower (121) | 87 |
| Makeup Air Compressor (124) | 53 |
| Oxygen Compressor (131) | 46 |
| Total | 186 |

Thermal energy requirements were calculated for the unit production of oxygen and are summarized in Table 3.

TABLE 3

| Energy Source (FIG. 1) | Thermal Energy, MMBTU per Ton Oxygen Product |
|---|---|
| Combustor 123 | 4.1 |
| Steam Produced, Ht. Exchanger 133 | −3.8 |
| Steam Produced, Ht. Exchanger 129 | −0.7 |
| Total | −0.4 |

The negative figures in Table 3 represent thermal energy recovered, and the net thermal energy credit of −0.4 MMBTU per ton of oxygen product is recovered as incremental electricity by generator 119 from the incremental steam produced in exchangers 129 and 133. This thermal energy credit can be converted to a cost equivalent mechanical energy credit by using a fuel value of $2.00/MMBTU and an equivalent value of electricity at $0.04/KWH. This conversion yields an equivalent mechanical energy credit of 20 KWH/ton oxygen, which reduces the mechanical energy requirement of Table 2 from 186 to 166 KWH per ton of oxygen produced.

A summary of the stream properties and compositions for the heat and material balance is given in Table 4.

TABLE 4

HEAT AND MATERIAL BALANCE FOR EXAMPLE 1 (FIG. 1)

| Stream | Temp, °F. | psia | \multicolumn{6}{c}{Mole Fraction} |
| | | | O2 | N2 | Ar | CH4 | H2O | CO2 |
| --- | --- | --- | --- | --- | --- | --- | --- | --- |
| 17 | 858 | 220.0 | 0.209 | 0.781 | 0.009 | 0.000 | 0.000 | 0.000 |
| 19 | 888 | 235.0 | 0.209 | 0.781 | 0.009 | 0.000 | 0.000 | 0.000 |
| 21 | 77 | 14.5 | 0.209 | 0.781 | 0.009 | 0.000 | 0.000 | 0.000 |
| 22 | 884 | 235.0 | 0.209 | 0.781 | 0.009 | 0.000 | 0.000 | 0.000 |
| 23 | 888 | 235.0 | 0.209 | 0.781 | 0.009 | 0.000 | 0.000 | 0.000 |
| 25 | 77 | 235.0 | 0.000 | 0.000 | 0.000 | 1.000 | 0.000 | 0.000 |
| 27 | 1562 | 225.0 | 0.174 | 0.769 | 0.009 | 0.000 | 0.032 | 0.016 |
| 29 | 1562 | 16.6 | 1.000 | 0.000 | 0.000 | 0.000 | 0.000 | 0.000 |
| 31 | 1562 | 225.0 | 0.097 | 0.840 | 0.010 | 0.000 | 0.035 | 0.018 |
| 32 | 90 | 614.7 | 0.000 | 0.000 | 0.000 | 0.000 | 1.000 | 0.000 |
| 33 | 600 | 614.7 | 0.000 | 0.000 | 0.000 | 0.000 | 1.000 | 0.000 |
| 35 | 117 | 14.7 | 1.000 | 0.000 | 0.000 | 0.000 | 0.000 | 0.000 |
| 37 | 466 | 60.0 | 1.000 | 0.000 | 0.000 | 0.000 | 0.000 | 0.000 |
| 39 | 90 | 614.7 | 0.000 | 0.000 | 0.000 | 0.000 | 1.000 | 0.000 |
| 47 | 858 | 220.0 | 0.097 | 0.840 | 0.010 | 0.000 | 0.035 | 0.018 |
| 49 | 600 | 614.7 | 0.000 | 0.000 | 0.000 | 0.000 | 1.000 | 0.000 |

| Stream | Temp, °F. | psia | \multicolumn{7}{c}{Flow Rate, lbmol per hr} | Flow, lb/hr. |
| | | | O2 | N2 | Ar | CH4 | H2O | CO2 | Total | Total |
| --- | --- | --- | --- | --- | --- | --- | --- | --- | --- | --- |
| 17 | 858 | 220.0 | 5.75 | 21.45 | 0.26 | 0.00 | 0.00 | 0.00 | 27.46 | 795.00 |
| 19 | 888 | 235.0 | 5.75 | 21.45 | 0.26 | 0.00 | 0.00 | 0.00 | 27.46 | 795.00 |
| 21 | 77 | 14.5 | 0.54 | 2.04 | 0.02 | 0.00 | 0.00 | 0.00 | 2.60 | 75.39 |
| 22 | 884 | 235.0 | 0.54 | 2.04 | 0.02 | 0.00 | 0.00 | 0.00 | 2.60 | 75.39 |
| 23 | 888 | 235.0 | 6.29 | 23.49 | 0.28 | 0.00 | 0.00 | 0.00 | 30.06 | 870.39 |
| 25 | 77 | 235.0 | 0.00 | 0.00 | 0.00 | 0.49 | 0.00 | 0.00 | 0.49 | 7.81 |
| 27 | 1562 | 225.0 | 5.31 | 23.49 | 0.28 | 0.00 | 0.98 | 0.49 | 30.55 | 878.20 |
| 29 | 1562 | 16.6 | 2.60 | 0.00 | 0.00 | 0.00 | 0.00 | 0.00 | 2.60 | 83.20 |
| 31 | 1562 | 225.0 | 2.71 | 23.49 | 0.28 | 0.00 | 0.98 | 0.49 | 27.95 | 795.00 |
| 32 | 90 | 614.7 | 0.00 | 0.00 | 0.00 | 0.00 | 1.32 | 0.00 | 1.32 | 23.76 |
| 33 | 600 | 614.7 | 0.00 | 0.00 | 0.00 | 0.00 | 1.32 | 0.00 | 1.32 | 23.76 |
| 35 | 117 | 14.7 | 2.60 | 0.00 | 0.00 | 0.00 | 0.00 | 0.00 | 2.60 | 83.20 |
| 37 | 466 | 60.0 | 2.60 | 0.00 | 0.00 | 0.00 | 0.00 | 0.00 | 2.60 | 83.20 |
| 39 | 90 | 614.7 | 0.00 | 0.00 | 0.00 | 0.00 | 6.94 | 0.00 | 6.94 | 124.95 |
| 47 | 858 | 220.0 | 2.71 | 23.49 | 0.28 | 0.00 | 0.98 | 0.49 | 27.95 | 795.00 |
| 49 | 600 | 614.7 | 0.00 | 0.00 | 0.00 | 0.00 | 6.94 | 0.00 | 6.94 | 124.95 |

EXAMPLE 2

Based on the results of Example 1, it is seen that oxidant gas 3 of FIG. 1 is depleted in oxygen, or conversely is enriched in nitrogen, relative to air. This is so because non-permeate stream 47 contains 84.2 mole % nitrogen (see Table 4) and is combined with compressed air from main compressor 103. The nitrogen concentration of oxidant 3 will depend upon the volume of borrowed air 17 relative to the volume provided by main compressor 103; the nitrogen concentration of oxidant 3 increases as the flow rate of borrowed air 17 increases.

Figure 3:
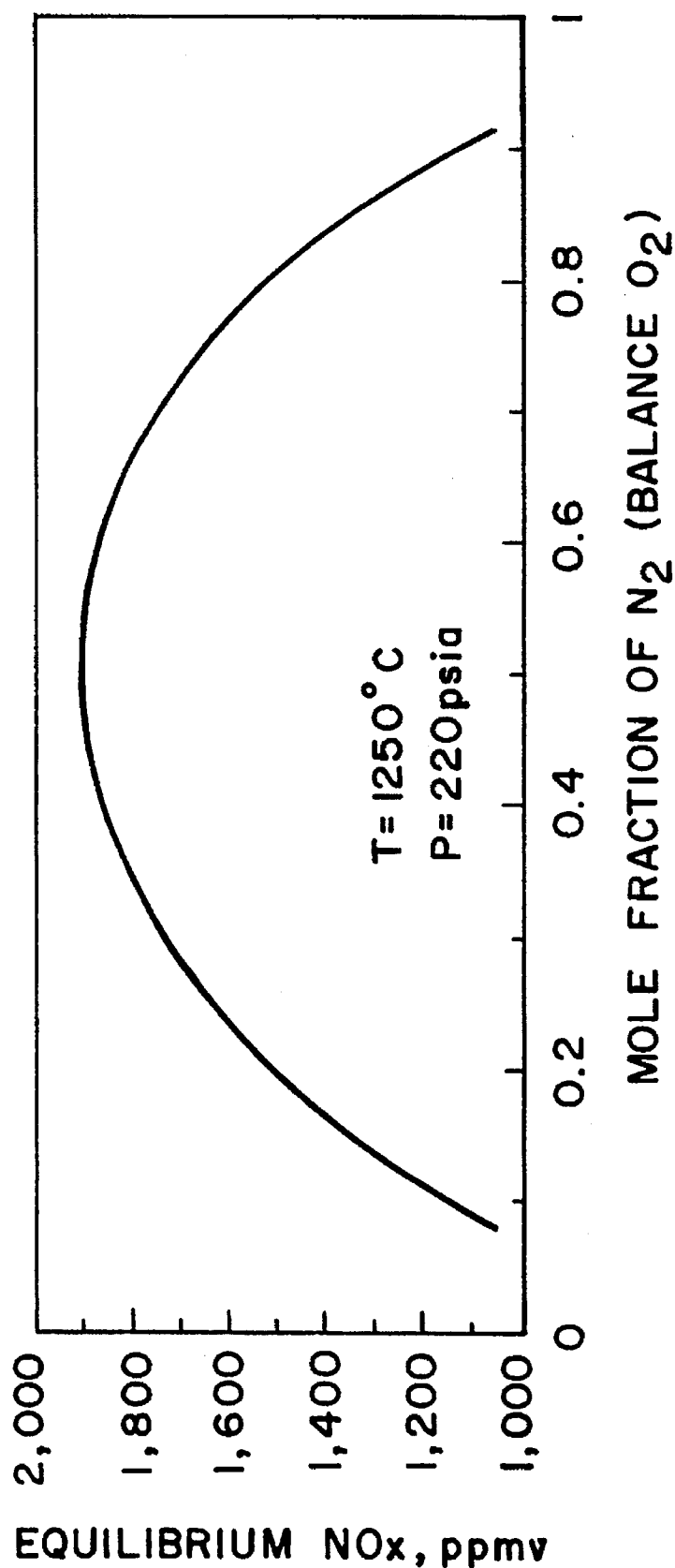
FIG. 3 is a plot of calculated equilibrium NOx concentrations vs nitrogen concentration for oxygen-nitrogen mixtures at 1,250° C. and 220 psig.

The fact that oxidant gas 3 is enriched in nitrogen yields a significant benefit of the present invention, namely, that the generation of nitrogen oxides (NOx) in combustor 105 is reduced relative to combustion with air. In order to show the relative effect of nitrogen concentration in the oxidant gas on the concentration of NOx in the combustion products, reaction equilibrium calculations were performed for the reaction between nitrogen and oxygen at typical gas turbine combustor conditions of 1,250° C. and 220 psia. The results are given in FIG. 3 and show that NOx concentration decreases sharply as the nitrogen mole fraction increases above that of air. This behavior is representative of combustion systems such as combustor 105 of FIG. 1, although the actual combustion products typically will not approach equilibrium and the NOx concentrations will be lower than those in FIG. 3. Actual NOx concentration levels will depend upon the characteristics of each specific combustor.

A relative NOx ratio is defined as the NOx concentration in combustion product stream 4 for a given nitrogen concentration in oxidant gas 3 to the NOx concentration in stream 4 when oxidant gas 3 is air. For nitrogen-enriched oxidant gas 3 and combustor 105 of FIG. 1, the ratio is anticipated to be similar to the ratio determined from FIG. 3. Relative NOx ratios were calculated using NOx concentrations as determined above for a series of nitrogen concentrations in oxidant gas 3 which correspond to increasing flow rates of borrowed air 17 as a fraction of compressed air 2, and the results are given in Table 5.

TABLE 5

Relative NOx Ratio vs Fraction of Borrowed Air
(Stream Designations from FIG. 1)

| Flow of Borrowed Air 17 as Fraction of Compressed Air 2 | Mole Fraction Oxygen in Oxidant Gas 3 to Combustor 105 | Relative NOx Ratio in Combustion Product 4 |
| --- | --- | --- |
| 0.0 | 0.209 | 1.00 |
| 0.50 | 0.153 | 0.88 |
| 0.75 | 0.124 | 0.81 |
| 0.90 | 0.107 | 0.76 |
| 0.95 | 0.102 | 0.74 |
| 1.00 | 0.096 | 0.72 |

These data show clearly that NOx is reduced as the amount of borrowed air increases. In the limit, when all of compressed air 2 passes through combustor 123 and membrane zone 125 and returns as stream 3 to combustor 105, the NOx level in combustion product 4 is reduced by 28% compared with operation of combustor 105 at design conditions with no borrowed air.

Thus the embodiments of the present invention as described above allow the production of high-purity oxygen at high temperature in conjunction with a gas turbine system which provides shaft power for air compression and optionally electric power generation. An important feature of the invention as described above is that the respective temperatures of the inlet streams to the membrane zone and the hot gas expansion turbine can be controlled independently to maximize the performance of both the membrane and the turbine. Thus the membrane and the turbine are thermally delinked and the overall efficiencies of oxygen generation and electric power generation can be maximized.

The present invention also provides a method for the production of high-purity oxygen in retrofit with an existing combined cycle power generation system. The process of the present invention allows operation of the gas turbine system at the original design efficiency by maintaining the temperature, pressure, and molar flow rate of the gas turbine inlet gas are maintained at design conditions.

Embodiments of the present invention also yield the unexpected benefit of reducing the concentration of NOx in the exhaust of the gas turbine when oxygen-depleted non-permeate from the membrane is introduced into the gas turbine combustor.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A method for the recovery of oxygen from an oxygen-containing gas which comprises:

(a) compressing an oxygen-containing gaseous feed stream and dividing the compressed stream into a first and a second compressed feed stream;

(b) combusting said first compressed feed stream with a first fuel in a first combustor to produce a hot pressurized combustion product;

(c) heating said second compressed feed stream to yield a hot oxygen-containing feed gas;

(d) passing said hot oxygen-containing feed gas into a membrane separation zone comprising one or more oxygen-selective ion transport membranes, and withdrawing therefrom a hot oxygen-enriched permeate stream and a hot oxygen-depleted non-permeate stream; and (e) combining said hot oxygen-depleted non-permeate stream and said hot pressurized combustion product and passing the combined hot gas stream through an expansion turbine to generate shaft power and hot exhaust gas, wherein said shaft power is used at least in part to compress said first feed stream.

2. The method of claim 1 which further comprises utilizing said shaft power in part to operate a first electric generator.

3. The method of claim 2 which further comprises cooling said hot exhaust gas by indirect heat exchange with water to generate steam and expanding the steam through a steam turbine to operate a second electric generator.

4. The method of claim 1 wherein said oxygen-enriched permeate stream is high purity oxygen containing at least 98 vol % oxygen.

5. The method of claim 1 wherein said ion transport membranes comprise one or more mixed conductor membranes.

6. The method of claim 1 wherein said ion transport membranes comprise one or more solid electrolyte membranes.

7. The method of claim 1 which further comprises compressing a supplemental air stream and combining it with said second compressed feed stream prior to heating in step (c).

8. The method of claim 1 wherein the heating of said second compressed feed stream in step (c) is accomplished by combusting said second compressed feed stream with a second fuel in a second combustor to yield said hot oxygen-containing feed gas.

9. The method of claim 1 wherein the heating of said second compressed feed stream in step (c) is accomplished by indirect heat exchange with a hot combustion product to yield said hot oxygen-containing feed gas, wherein said hot combustion product is obtained by combusting said hot oxygen-depleted non-permeate stream with a second fuel in a second combustor.

10. The method of claim 1 wherein the heating of said second compressed feed stream in step (c) is accomplished by preheating said second compressed feed stream by indirect heat exchange with said hot oxygen-depleted non-permeate stream and combusting the resulting preheated compressed feed stream with a second fuel in a second combustor to yield said hot oxygen-containing feed gas.

11. The method of claim 7 wherein the temperature, pressure, and mass flow rate of said combined hot gas stream of step (e) to said expansion turbine are maintained at fixed values by controlling the flow rate of said supplemental air stream and the firing rate of said first combustor.

12. The method of claim 1 which further comprises compressing said second compressed feed stream prior to step (c).

13. The method of claim 1 which further comprises introducing water into said hot oxygen-depleted non-permeate stream prior to said expansion turbine, thereby cooling and increasing the mass flow rate of said stream, and optionally introducing at least a portion of the resulting cooled stream into said first combustor.

14. The method of claim 1 which further comprises introducing water into said first compressed feed stream prior to said first combustor.

15. The method of claim 3 which further comprises cooling said hot oxygen-enriched permeate stream by indirect heat exchange with water to generate steam and introducing the steam into the inlet of said steam turbine.

16. The method of claim 3 which further comprises cooling said hot oxygen-depleted non-permeate stream by indirect heat exchange with water to generate additional steam and introducing this steam into the inlet of said steam turbine.

17. The method of claim 16 which further comprises introducing at least a portion of the resulting cooled oxygen-containing non-permeate stream directly into said first combustor.

18. The method of claim 16 which further comprises combining at least a portion of the resulting cooled oxygen-containing non-permeate stream with said first compressed feed stream prior to said first combustor.

19. The method of claim 8 wherein the temperature of said membrane separation zone is maintained at a temperature between 800° and 2,000° F. by controlling the firing rate of said second combustor.

20. The method of claim 1 wherein the flow rate of said second compressed feed stream is up to 20% of the flow rate of said oxygen-containing gaseous feed stream.

* * * * *